March 1, 1938.   L. H. SCURLOCK   2,109,653
JUICE EXTRACTOR
Filed Nov. 27, 1936
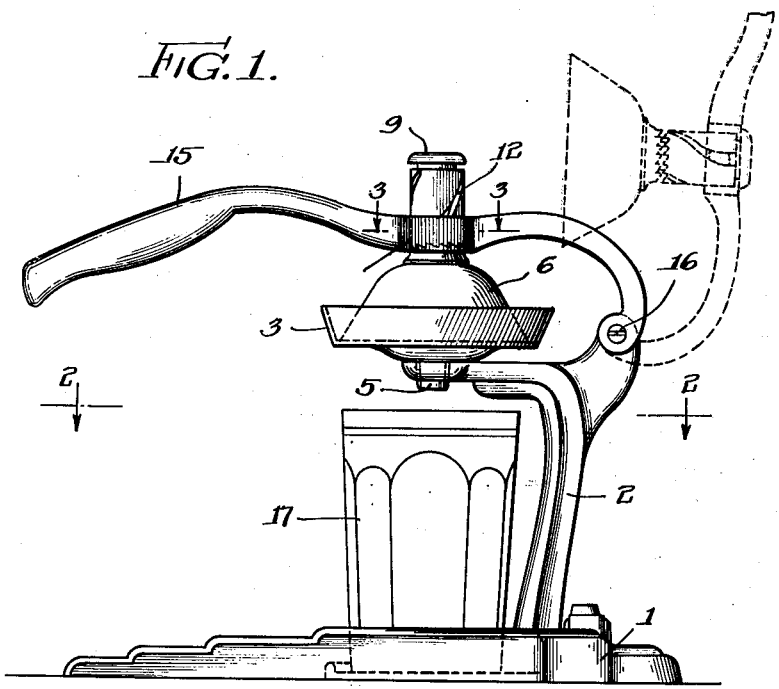
Fig. 1.
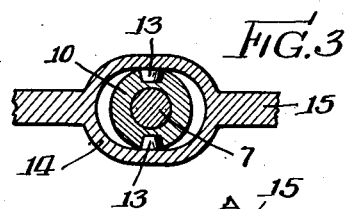
Fig. 2.
Fig. 3.
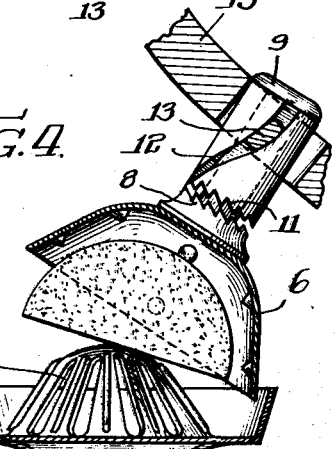
Fig. 4.
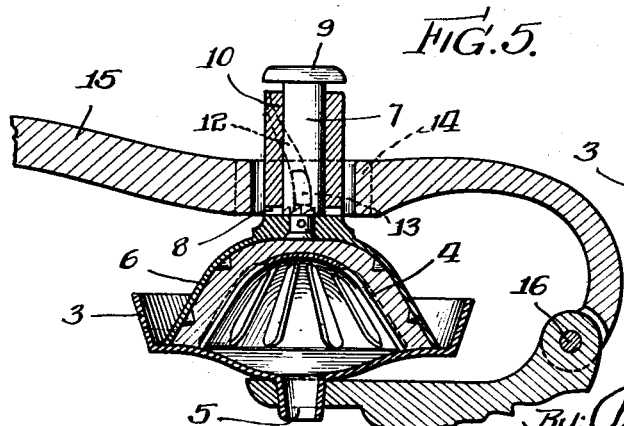
Fig. 5.
Inventor
Lewis H. Scurlock
By: Arthur F. Durand, atty.

Patented Mar. 1, 1938

2,109,653

UNITED STATES PATENT OFFICE 2,109,653

JUICE EXTRACTOR

Lewis H. Scurlock, Chicago, Ill.

Application November 27, 1936, Serial No. 112,885

4 Claims. (Cl. 146—3)

This invention relates to juice extractors for squeezing juice from lemons and oranges and similar fruit.

Generally stated, the object of the invention is to provide an improved construction and arrangement whereby half a lemon, for example, is compressed between a lower member having a cone formation, and an upper member having a more or less complementary cup formation, in combination with means whereby the upper cup-like member is given more or less rotation about a substantially vertical axis, thereby to rotate the section of lemon on the cone of said lower member, by manual pressure exerted downwardly on a handle, when the invention is used as a hand squeezer, but the downward pressure can also be exerted by any suitable power applied thereto, in any suitable or desired manner, the rotation of the upper cup-like member being intermittent and all in one direction, instead of rotating first in one direction and then in the other.

It is also an object to provide certain details and features of construction tending to increase the general efficiency and desirability of a juice extractor of this particular character.

To the foregoing and other useful ends, the invention consists in matters hereinafter set forth and claimed and shown in the accompanying drawing in which—

Fig. 1 is a side elevation of a juice extractor embodying the principles of the invention.

Fig. 2 is a horizontal section on line 2—2 in Fig. 1 of the drawing.

Fig. 3 is an enlarged detail horizontal section on line 3—3 in Fig. 1 of the drawing.

Fig. 4 is a detail sectional view, on a larger scale, of the upper and lower squeezing members and the mechanism for rotating the upper member.

Fig. 5 is a similar view showing the parts in final position for the final compression of a lemon or orange section between the upper and lower members.

As thus illustrated, the invention comprises a base 1 having an upright bracket arm 2 upon which the lower cup-like member 3 is mounted, this member having a cone formation 4 to receive the lower side of the lemon half, as shown in Figs. 4 and 5 of the drawing. The said cone formation 4 is of such character that the juice will flow down and out through the bottom spout 5 of the lower member.

The upper inverted cup-shaped member 6 is secured to the lower end of a stem 7 provided at its base or hub with clutch teeth 8 as shown. The top of the stem is provided with a head 9, and a sleeve 10 which is freely rotatable on said stem is interposed between the said head and the said teeth. The lower end of said sleeve has teeth 11 to interlock with the teeth 8, thereby to form a clutch for rotating the upper member 6 when it is brought down upon the lemon half. It will be seen that the sleeve 10 is slidable up and down on the stem 7, thereby to alternately engage and disengage the teeth 11 with the teeth 8, thereby in effect to alternately close and open the clutch.

The sleeve 10 is provided with helical grooves 12 for engagement with the ribs 13 formed on the inner side of the yoke 14, which latter is an integral middle portion of the handle 15 that is pivoted at its proximal end at 16 to the top of the bracket 2 previously mentioned. In use, when a tumbler 17 is placed on the base 1, in position below the spout 5, a lemon half or orange half, for example, is then placed in position on the cone formation 4, as shown in Fig. 4 of the drawing, and the handle 15 is then pressed down to squeeze the juice out of the lemon section. The action of the ribs 13 in the grooves 12 will cause the sleeve 10 to rotate, and with the teeth in interengagement, as shown in Fig. 4, this will cause the inverted cup-shaped member 6 to rotate. In this way, the lemon half will be rotated a distance on the cone formation 4, so that the latter may grind out the pulp from the lemon half, as well as extract the juice. When the handle 15 is raised, such action will raise the sleeve 10 into the position shown in Fig. 5 of the drawing, there being sufficient friction between the parts to do this, and when the handle is raised a greater distance, the rind of the lemon or orange can then be removed. Thus the rotation of the member 6 is all in one direction, as it does not rotate when it is raised for the insertion of another lemon half. To the contrary, it only rotates when pressed downward, so that this inverted cup-shaped member 6 is in one rotative position on one lemon half, and is in a different rotative position on the next lemon half, and in this way the member 6 in time makes a complete rotation, and then by intermittent partial rotation makes successive complete rotations.

Obviously, the invention can be used with any other fruit, such as oranges, limes, grapefruit, etc.

What I claim as my invention is:

1. In a juice extractor, a lower member having a cone formation to engage the pulp side of a lemon half, an upper inverted cup-shaped member for engaging the upper or rind side of the lemon half, and means for pressing the upper member downwardly and at the same time rotating the same, to cause the lemon half to rotate on the cone formation, having provisions whereby such rotation is always in the same direction, so that the upper member has a certain rotative position on one lemon half, and has a different rotative position on the next lemon half, and thus in time makes successive complete rotations each in the same direction, said provisions comprising a rigid stem for the upper member, a loose sleeve on said stem, with a tooth clutch connection between the lower end of the sleeve and the base of said stem, said sleeve having helical grooves, and means for engaging said grooves to produce the said rotation, said clutch opening to prevent rotation of the upper means when the latter is raised.

2. In a juice extractor, a lower member having a cone formation to engage the pulp side of a lemon half, an upper inverted cup-shaped member for engaging the upper or rind side of the lemon half, and power applying means for pressing the upper member downwardly and thereby at the same time rotating the same, to cause the lemon half to rotate on the cone formation, having provisions controlled automatically and entirely through said power applying means and whereby such rotation is always in the same direction, so that the upper member has a certain rotative position on one lemon half, and has a different rotative position on the next lemon half, and thus in time makes successive complete rotations each in the same direction, said provisions comprising a rigid stem for the upper member, a loose sleeve on said stem, with a tooth clutch connection between the lower end of the sleeve and the base of said stem, said sleeve having helical grooves, and means for engaging said grooves to produce the said rotation, said clutch opening to prevent rotation of the upper member when the latter is raised.

3. A structure as specified in claim 1, said groove engaging means comprising a pivoted hand lever having studs projecting into said grooves.

4. A structure as specified in claim 1, comprising a head forming a stop on the upper end of said stem to limit the upward movement of the sleeve thereon.

LEWIS H. SCURLOCK.